Figure 1:
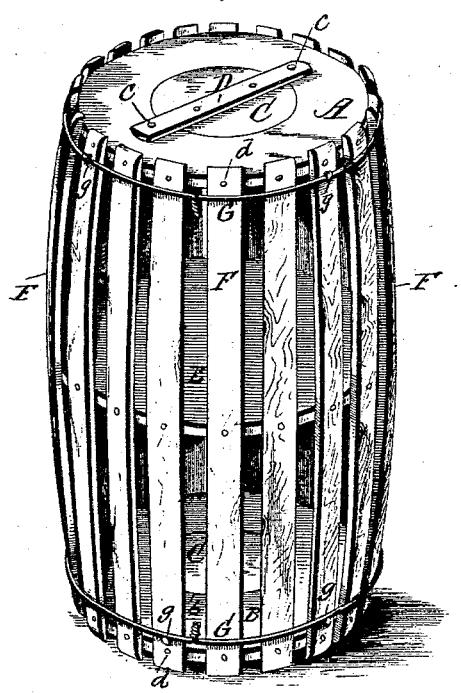

(No Model.)

T. B. ASHFORD.
FRUIT OR VEGETABLE CRATE.

No. 411,740. Patented Sept. 24, 1889.

Witnesses
Chas. J. Williamson
E. H. Bond

Inventor
Thomas B. Ashford.
per Chas. H. Fowler
Attorney.

UNITED STATES PATENT OFFICE.

THOMAS B. ASHFORD, OF KINSTON, NORTH CAROLINA, ASSIGNOR OF THREE-FOURTHS TO HENRY D. HARPER, OF SAME PLACE.

FRUIT OR VEGETABLE CRATE.

SPECIFICATION forming part of Letters Patent No. 411,740, dated September 24, 1889.

Application filed July 8, 1889. Serial No. 316,858. (No model.)

*To all whom it may concern:*

Be it known that I, THOMAS B. ASHFORD, a citizen of the United States, residing at Kinston, in the county of Lenoir and State of North Carolina, have invented certain new and useful Improvements in Fruit or Vegetable Crates; and I do hereby declare that the following is a full, clear, and exact description of the same, reference being had to the annexed drawings, making a part of this specification, and to the letters and figures of reference marked thereon.

This invention relates to that class of fruit or vegetable crates consisting of a central partition and heads and staves connected thereto, with spaces between the staves for the proper ventilation of the contents.

It has for its object to provide against the springing off of the ends of the staves, which is liable to occur when the staves are bulged out at their center to give a barrel form to the crate.

The invention consists in the peculiarities of construction, and in the combinations, arrangement, and adaptation of parts, all as more fully hereinafter described, shown in the drawings, and then particularly pointed out in the appended claim.

The invention is clearly illustrated in the accompanying drawings, which, with the letters of reference marked thereon, form a part of this specification, and in which—

Figure 2:
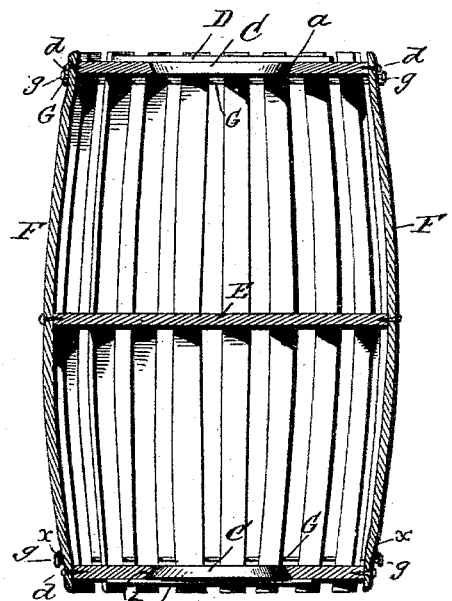

Figure 1 is a perspective view of my improved crate. Fig. 2 is a central vertical section through the same.

Referring now to the details of the drawings by letter, A designates one of the heads, and B the other. These heads are each formed of a single piece provided at its center with an opening $a$ and $b$, respectively, the walls of the opening being beveled or inclined from the outside inward, as clearly shown in Fig. 2. These openings are closed by the removable supplemental heads C, the periphery of which is inclined to correspond with the bevel of the openings, so as to form tight joints when the supplemental heads are in place. To each supplemental head on the outside thereof there is secured a transverse bar or strip D, the ends of which extend beyond the said head, as shown, the bar being of course of less length than the main head of the barrel, as shown. This bar serves as a convenient means of handling the supplemental head, and when the head is in place and it is desired to secure it there a fastening, as a nail, is passed through each end into the main head of the crate, as shown at $c$ in Fig. 1.

E is a central partition of slightly greater diameter than the heads, to give the crate a barrel form by bulging the same outward at the center.

F are the staves, permanently secured to the heads and central partition in any suitable manner, preferably by means of short nails, as $d$.

In assembling the parts the staves are first nailed to the central partition, and the ends of the staves are then sprung inward and nailed to the heads, and to prevent the springing off of these ends, as they are liable to do unless some provision is made to prevent the same, I take a wire G and pass it around the staves just beyond the points of attachment of the staves, and then twist the ends of the said wire together to draw it taut around the staves, and when it has been drawn taut I fasten the ends in any suitable manner. This springs the staves slightly inward near their attachment to the heads, and serves to destroy any tendency thereof to spring outward and withdraw their fastenings. I deem the wire especially important. It forms a binding-hoop and enables me to construct a better crate at less expense than where band-hoops are employed, the twisting of the ends being preferable to driving, enabling me to get a smaller diameter of staves, providing the necessary inward spring without driving the hoop so far on. I can also force all the staves inward simultaneously and more uniformly than by driving. To prevent the working off of the wires, I drive into the staves a number of headed pins $g$, against which the wires will rest, as clearly shown in Fig. 1.

It will be observed that by the above construction I provide for ready access to either or both of the compartments of the crate without removal of the main heads of the crate and provide a crate that in general is superior to prior constructions of this character.

The special form of wire fastenings with the headed pins to prevent displacement of the same is considered important.

The main heads being permanently attached to the staves, the removal of the supplemental heads does not affect the connection between the heads and staves, and thus access may be had to both of the compartments at the same time.

What I claim as new is—

The combination, with a central partition and heads of less diameter than the partition, of staves secured to the central partition and at their ends sprung inward and secured to the heads, and the binding-wires passed around the staves near their attachment to the heads between said attachment and the central partition and drawn tight, the staves being thereby drawn inward, as shown at X, the ends of the wires being twisted to prevent springing of the ends of the staves from the heads, substantially as shown and described.

In testimony that I claim the above I have hereunto subscribed my name in the presence of two witnesses.

THOS. B. ASHFORD.

Witnesses:
A. J. LOFTIN,
L. A. MEWBOM.